(12) United States Patent
Bai et al.

(10) Patent No.: US 10,924,173 B2
(45) Date of Patent: Feb. 16, 2021

(54) BEAM MANAGEMENT IN DIRECTIONAL BEAM NETWORKS

(71) Applicant: QUALCOMM Incorporated, San Diego, CA (US)

(72) Inventors: Tianyang Bai, Bridgewater, NJ (US); Navid Abedini, Somerset, NJ (US); Juergen Cezanne, Ocean Township, NJ (US); Muhammad Nazmul Islam, Edison, NJ (US); Vasanthan Raghavan, West Windsor Township, NJ (US); Jianghong Luo, Skillman, NJ (US); Sundar Subramanian, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/162,015

(22) Filed: Oct. 16, 2018

(65) Prior Publication Data

US 2019/0132040 A1 May 2, 2019

Related U.S. Application Data

(60) Provisional application No. 62/580,801, filed on Nov. 2, 2017.

(51) Int. Cl.
| | |
|---|---|
| *H04B 7/06* | (2006.01) |
| *H04B 7/0408* | (2017.01) |
| *H04B 7/08* | (2006.01) |
| *H04W 76/19* | (2018.01) |
| *H04W 16/28* | (2009.01) |

(Continued)

(52) U.S. Cl.
CPC ......... *H04B 7/0639* (2013.01); *H04B 7/0408* (2013.01); *H04B 7/0695* (2013.01); *H04B 7/088* (2013.01); *H04B 7/18582* (2013.01); *H04B 17/309* (2015.01); *H04W 52/42* (2013.01); *H04W 76/19* (2018.02); *H04W 16/28* (2013.01)

(58) Field of Classification Search
CPC .. H04B 7/0639; H04B 17/309; H04B 7/0408; H04B 7/18582; H04W 16/28
See application file for complete search history.

(56) References Cited

U.S. PATENT DOCUMENTS

| 2013/0182683 A1* | 7/2013 | Seol | H04W 72/046 |
| | | | 370/335 |
| 2016/0044517 A1* | 2/2016 | Raghavan | H04W 16/28 |
| | | | 370/329 |

(Continued)

OTHER PUBLICATIONS

International Search Report and Written Opinion—PCT/US2018/057081—ISA/EPO—dated Jan. 24, 2019.

*Primary Examiner* — Janice N Tieu

(57) ABSTRACT

High frequency wireless communication networks rely on directional transmit and receive beams to achieve large gains and overcome large pathlosses associated with high frequency signals. With highly directional signals, link failure may occur. Network nodes associated with the link failure, may need to identify new beam pairs and establish a new link as quickly as possible. In several aspects, beam sweep procedures are expedited, allowing for rapid link reestablishment. Disclosed techniques allow for rapid link reestablishment with and without beam correspondence.

20 Claims, 13 Drawing Sheets

(51) Int. Cl.
　　　*H04B 17/309*　　(2015.01)
　　　*H04B 7/185*　　(2006.01)
　　　*H04W 52/42*　　(2009.01)

(56) References Cited

U.S. PATENT DOCUMENTS

| | | |
|---|---|---|
| 2016/0269093 A1 | 9/2016 | Seol et al. |
| 2017/0251518 A1* | 8/2017 | Agiwal ................. H04W 24/08 |
| 2017/0302349 A1 | 10/2017 | Sun et al. |
| 2017/0303264 A1 | 10/2017 | Islam et al. |
| 2018/0084546 A1* | 3/2018 | Guo .................... H04W 72/042 |
| 2018/0279364 A1* | 9/2018 | Hui ..................... H04W 74/085 |
| 2019/0104550 A1* | 4/2019 | Yang ..................... H04W 72/04 |
| 2019/0373502 A1* | 12/2019 | Chae ................. H04W 28/0289 |

* cited by examiner

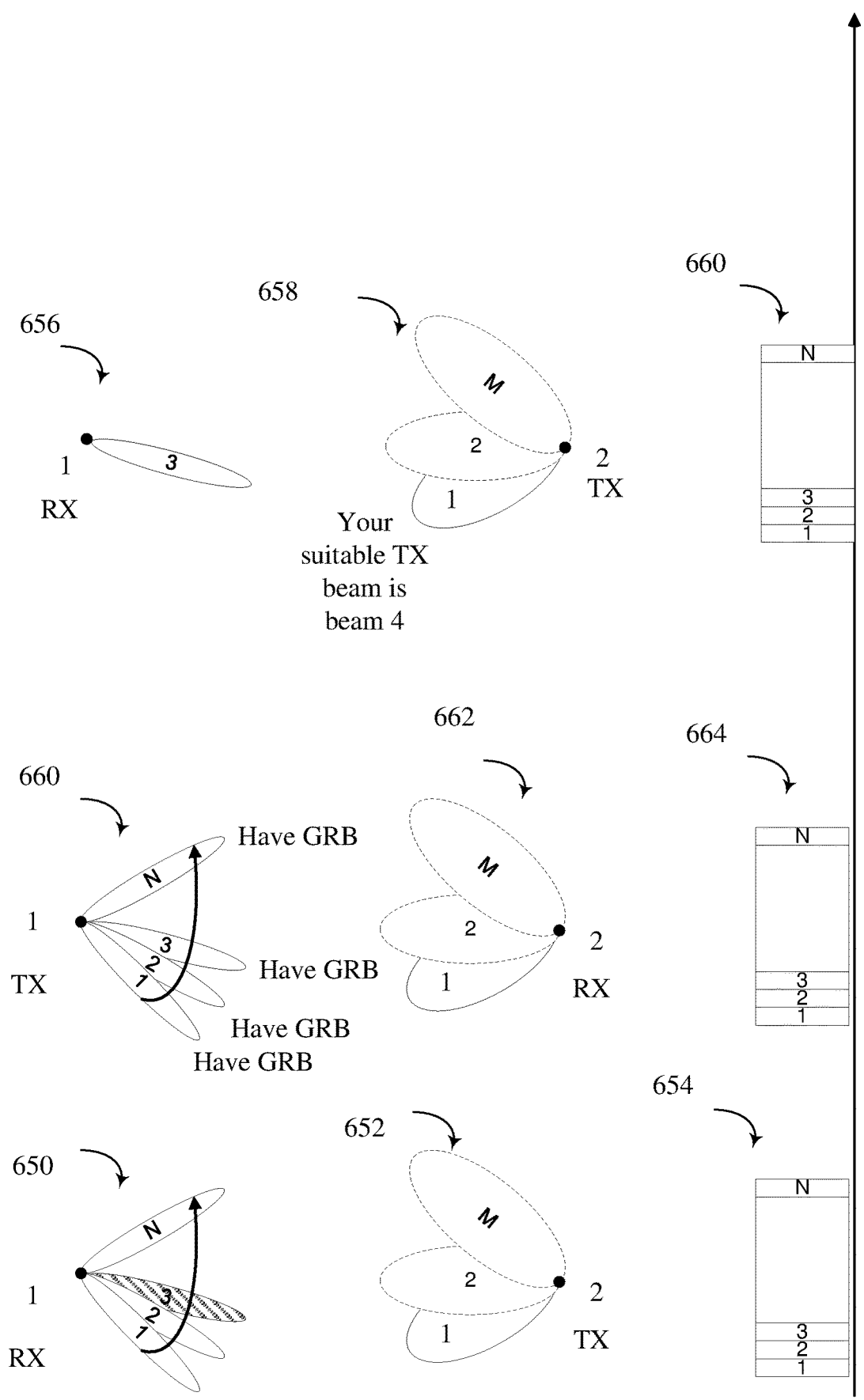

US 10,924,173 B2

BEAM MANAGEMENT IN DIRECTIONAL BEAM NETWORKS

CROSS REFERENCE TO RELATED APPLICATIONS

This application claims the benefit of U.S. Provisional Application Ser. No. 62/580,801, entitled "BEAM MANAGEMENT IN DIRECTIONAL BEAM NETWORKS" and filed on Nov. 2, 2017 which is expressly incorporated by reference herein in its entirety.

BACKGROUND

The following relates generally to wireless communication, and more specifically to beam management and link recovery in directional beam networks.

Wireless communications systems are widely deployed to provide various types of communication content such as voice, video, packet data, messaging, broadcast, and so on. These systems may support communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., Long Term Evolution (LTE) system, or a New Radio (NR) system). A wireless multiple-access communications system may include base stations (e.g., a gNB or eNB) or other access network nodes, each simultaneously supporting communication for multiple communication devices, which may be otherwise known as user equipment (UE).

In some wireless systems, base stations and UEs may communicate using directional transmissions (e.g., beams), where beamforming techniques may be applied using one or more antenna arrays to generate beams in different directions. For example, a base station may transmit downlink communications (e.g., synchronization signals, data, etc.) to a UE using a transmit beam in one direction, and the UE may in turn receive the downlink communications on a receive beam in an opposite direction. If there is beam correspondence, the UE may also transmit in the opposite direction of its receive beam and the base station may receive in the opposite direction of its transmit beam. Occasionally, there may not be beam correspondence, with the base station or the UE having transmit and receive beams that may be in opposite directions or may have different shapes. For a variety of reasons, conditions may change and the transmit and receive antenna gains may degrade to the point of link failure. Accordingly, there is a need for techniques that provide for quick link recovery in the event of link failure.

Base stations, such as gNBs operating in the millimeter wave (mmW) frequency ranges, e.g., 28 GHz, 40 GHz, 60 GHz, etc., may be associated with a reduced coverage area (e.g., a smaller geographic footprint, directional transmissions only, etc.), which may result in deployment of a much larger number of base stations to provide acceptable coverage areas. Such large-scale deployments may make wired links to each gNB very expensive and impractical. gNBs in these deployments may thus rely heavily on high frequency wireless links with directional beams for backhaul operations. Wireless links, especially mmW links, are vulnerable to link failure. Accordingly, there is a need for techniques for quick link recovery in the event of link failure.

SUMMARY

In one aspect, a first node may sweep over N directional receive beams associated with one of M possible transmit bursts; determine if one of the N directional receive beams is a suitable receive beam; and transmit an indication to a second node when the second node has transmitted on a suitable transmit beam. In a complementary aspect, a second node, may sweep over M possible transmit beams transmitting a burst on each beam and receiving an indication from the first node when the second node has transmitted on a suitable beam.

In another aspect, a first node, may sweep over N directional transmit beams transmitting a first burst and receive over N directional receive beams associated with a second burst. The first node may then determine if one of the N directional receive beams is a suitable receive beam and transmit an indication to a second node when the second node has transmitted on a suitable transmit beam. In a complimentary aspect, a second node may receive on a first of M possible receive beams associated with a first burst and determine if the receive beam is a suitable receive beam. When the receive beam is a suitable beam the second node transmit on a transmit beam corresponding to the suitable receive beam and when the receive beam is not a suitable beam, the second node may transmit on a transmit beam corresponding to a second of M possible receive beams.

In a further aspect, a first node may receive over N directional receive beams associated with a first burst and sweep over N directional transmit beams transmitting a second burst. The first node may determine if one of the N directional receive beams is a suitable receive beam. The first node may also receive an information from a second node about a suitable transmit beam. In a complementary aspect, a second node may transmit on a first of M possible transmit beams a first burst and receive on a beam corresponding to the first of M possible transmit beams a portion of a second burst. The second node may determine a suitable transmit beam for a first node and transmit to the first node information identifying the suitable transmit beam.

BRIEF DESCRIPTION OF THE DRAWINGS

FIGS. 6A and 6B illustrates a third example of expedited link recovery in accordance with aspects of the present disclosure.

DETAILED DESCRIPTION

Figure 1:
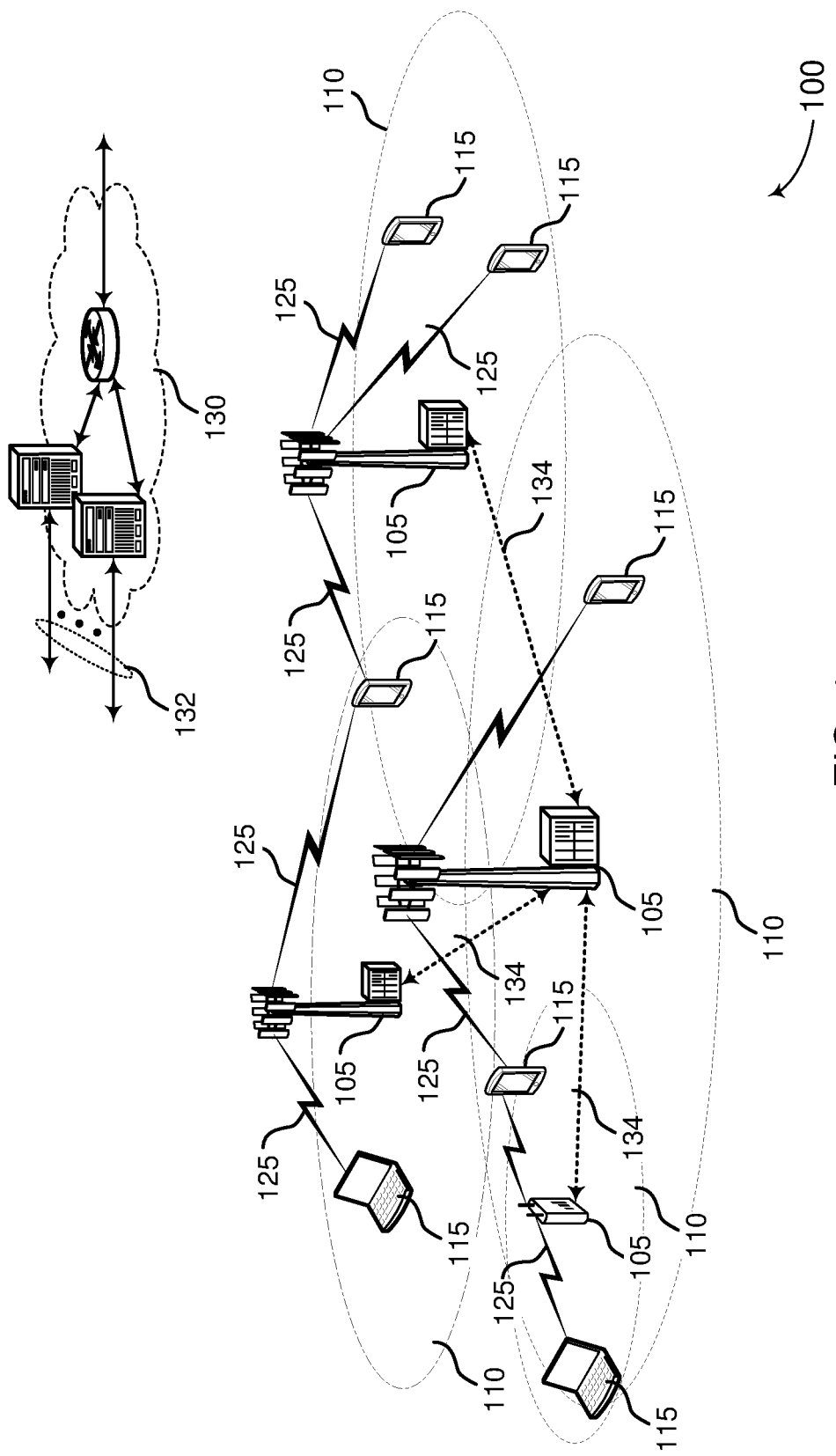
FIG. 1 illustrates an example of a system for wireless communication that supports beam recovery in accordance with aspects of the present disclosure.

Some wireless communication systems may support beamformed transmissions between base stations and between a base station and a user equipment (UE). For example, some systems may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome path losses at these frequencies. Communication links, however, that use beamformed transmissions may be susceptible to link failure. When link failure occurs, expedited link recovery may be of great importance.

In one aspect, beam recovery may be expedited by adding a single feedback bit and a small transmit receive switching time to a burst. In the event of link failure, a first node associated with the link failure may perform a beam sweeping operation by receiving over N beams in a sequential series of bursts. The second node associated with the link failure may sweep through M transmit beams transmitting on each beam for one burst. After each burst the first node may determine if there is a suitable beam pair for a link. If there is, the first node may transmit a feedback bit on a transmit beam corresponding to the receive beam associated with the suitable beam pair. This will indicate to the second node that the previously used beam for transmitting the burst is a suitable beam. Assuming beam correspondence, the suitable beam pair may be used for reestablishing a communication link between first and second node.

In another aspect, beam recovery may be expedited by alternating beam sweep transmissions between the first node and the second node. During odd number bursts, the first node may transmit over N transmit beams. The second node may receive on one of M beams. If the receive beam is a suitable beam, the second node will transmit on the corresponding transmit beam on the next burst and send an indication that a suitable beam pair has been found. If it is not a suitable beam, the second node will continue its beam sweep advancing to the next beam. During even number bursts the second node will transmit a burst on one of M beams and first node will sweep over N receive beams. If a suitable receive beam is found, the first node will transmit a feedback bit, on a transmit beam corresponding to the suitable receive beam. Assuming beam correspondence, the suitable beam pair may be used for reestablishing a communication link between first and second node.

In an aspect without beam correspondence on one node, link recovery may be expedited through alternate beam transmit and receive sweeps. In the event of link failure, a first node associated with the link failure may perform a beam sweeping operation by receiving over N receive beams and then transmitting over N corresponding transmit beams until a suitable beam pair. When a suitable receive beam is found, the first node may send an indication to the second node that a receive beam has been found. The second node associated with the link failure may sweep through M transmit beams first transmitting a burst on each beam and then receiving on each corresponding beam. When the second node, receives an indication that the first node has found a suitable receive beam, the second node will cease the beam sweep and use the last beam used. When the first node transmits the next burst, the second node may then determine which of the first nodes N transmit beams is a suitable transmit beam. The second node may then transmit information to the first node identifying the suitable transmit beam.

In each of these aspects, it may be possible that the beam sweeps do not identify any suitable transmit and receive beam pairs. In that case, the sweeps may be repeated by increasing power on the transmit beams. Transmit power may be progressively increased until a suitable beam pair may be identified. In several aspects, the initial power for the transmit beams may be set at the transmission power used before link failure. Increasing the power on a subset of all beams is also contemplated.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long-Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support the use of a difference in transmit and receive array gains for the calculation of an uplink transmit power. Accordingly, a power offset may be used when calculating an uplink random access transmit power.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Backhaul links may be wired or unwired. Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as gNBs 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support mmW communications between UEs 115 and base stations 105 and in backhaul links 132, 134. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a network device or core network 130 supporting radio bearers for user plane data. At the physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. After receiving the PSS and SSS, the UE 115 may receive a master information block (MIB), which may be transmitted in a physical broadcast channel (PBCH) by the base station 105. The MIB may contain system bandwidth information, a system frame number (SFN), and a physical HARQ indicator channel (PHICH) configuration.

After decoding the MIB, the UE 115 may receive one or more system information blocks (SIBs). For example, SIB1 may contain cell access parameters and scheduling information for other SIB s. For instance, SIB1 access information, including cell identity information, and it may indicate whether a UE 115 is allowed to camp on a coverage area 110. SIB1 also includes cell selection information (or cell selection parameters) and scheduling information for other SIBs, such as SIB2. Decoding SIB1 may enable the UE 115 to receive SIB2, where SIB2 may contain radio resource control (RRC) configuration information related to random access channel (RACH) procedures, paging, physical uplink control channel (PUCCH), physical uplink shared channel (PUSCH), power control, sounding reference signal (SRS), and cell barring. Different SIBs may be defined according to the type of system information conveyed. In some cases, SIB2 may be scheduled dynamically according to information in SIB1, and includes access information and parameters related to common and shared channels.

After the UE 115 decodes SIB2, it may transmit a RACH preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an uplink resource grant, a timing advance, and a temporary cell radio network temporary identifier (C-RNTI). The UE 115 may then transmit an RRC connection request along with a temporary mobile subscriber identity (TMSI) (e.g., if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115), the UE 115 may repeat the RACH process by transmitting a new RACH preamble.

Wireless devices in wireless communications system 100 may send transmissions in accordance with a certain link budget. The link budget may account for allowed signal attenuation between a UE 115 and a base station 105, as well as antenna gains at the UE 115 and base station 105. Accordingly, the link budget may provide, for example, a maximum transmit power for the various wireless devices within wireless communications system 100. In some cases, a UE 115 may coordinate transmit power with a serving base station 105 to mitigate interference, improve the uplink data rate, and prolong battery life. FIG. 1 illustrates an example of a system for wireless communication that supports beam recovery in accordance with aspects of the present disclosure.

Figure 2:
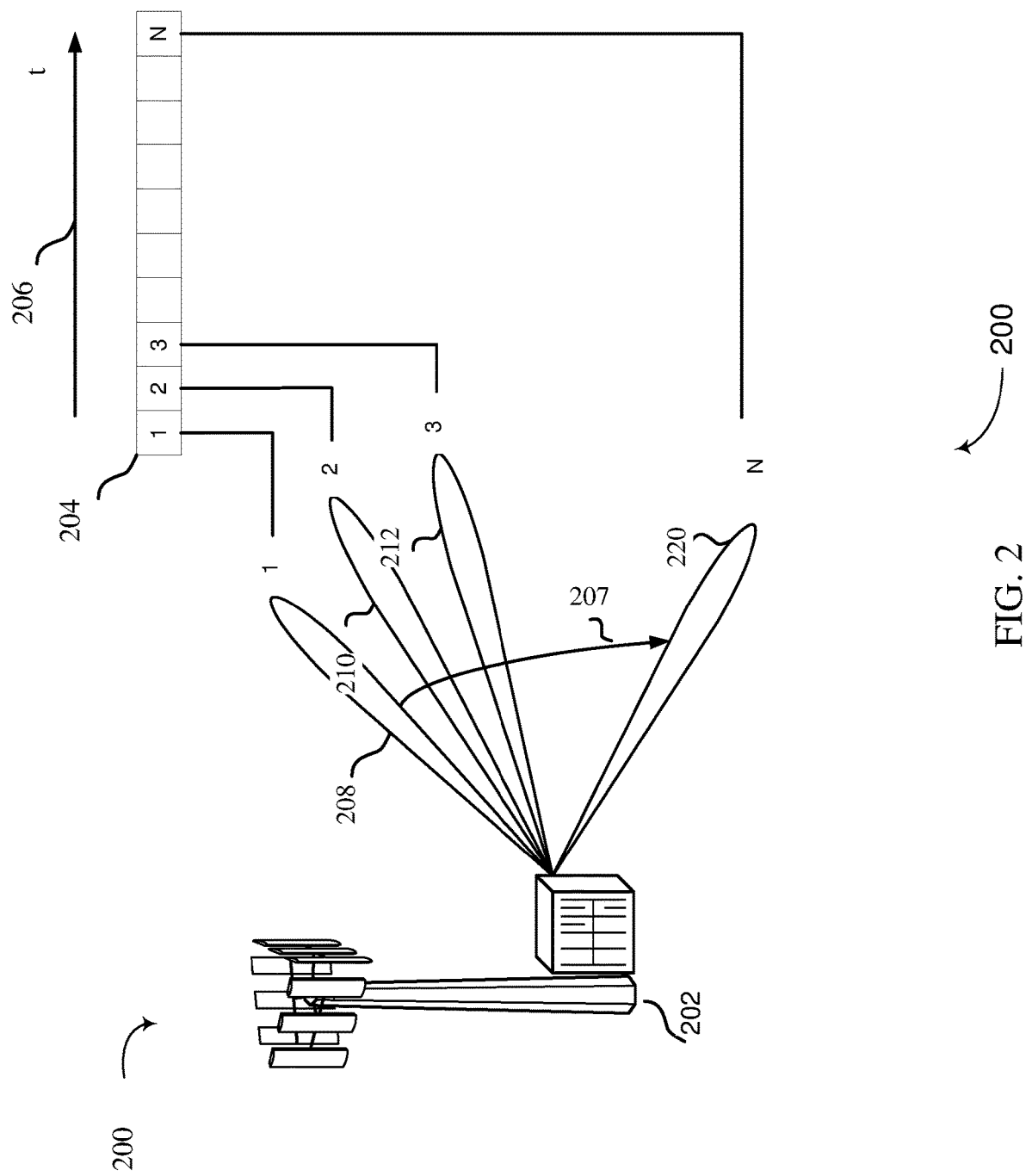
FIG. 2 illustrates an example of a node transmitting in a burst in accordance with aspects of the present disclosure.

FIG. 2 illustrates an example of a node for wireless communication 200 that supports transmitting a burst in accordance with aspects of the present disclosure. A wireless communication node 202 is shown transmitting a burst 204. The burst 204 may be transmitted with the wireless communication node 202 sweeping over many directional transmission beams in a short period of time 206. The burst 204 may be transmitted by systematically transmitting over individual directional transmission beams in a beam sweep 207 operation. In this example, the beam sweep 207 is comprised of a burst 204 over a first directional beam 208, followed by a second directional beam 210, followed by a third directional beam 212 and so on, until a final Nth directional beam 200. In various aspects, node 202 may transmit the burst 204 dwelling on each of the directional transmission beams for one or more resources.

In various aspects, the burst 204 may be transmitted on a resource slot. Node 202 may be for example a gNB, UE, relay or any other wireless communication node. The directional beams 208, 210, 212, ... 220 may be, for example, high frequency beams such as mmW beams. The directional beams 208, 210, 212, ... 220 may be generated, for example, using conventional beamforming techniques using one or more antenna arrays.

Figure 3:
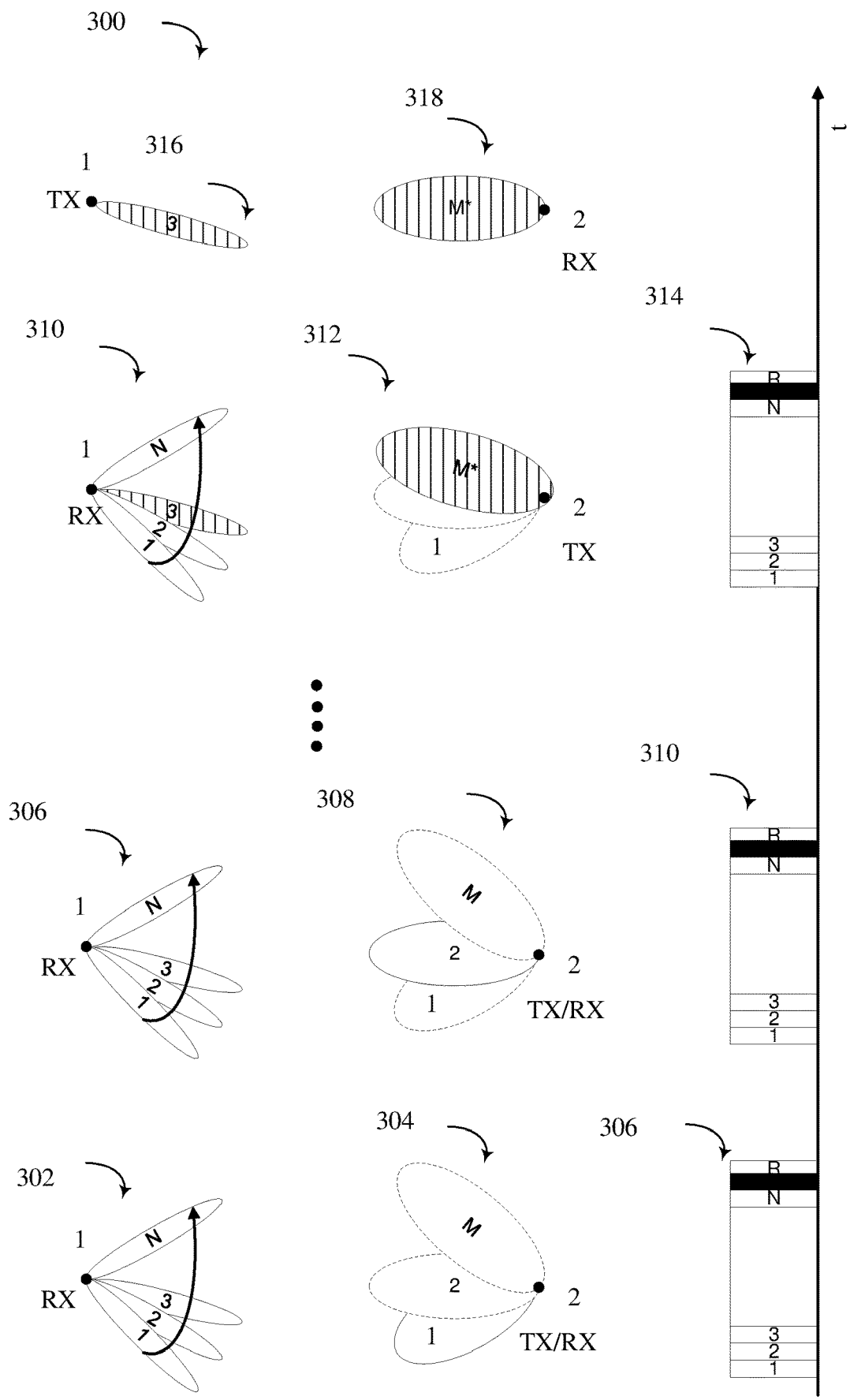
FIG. 3 illustrates a first example of expedited link recovery in accordance with aspects of the present disclosure.

FIG. 3 illustrates an example of expedited link recovery 300 in accordance with aspects of the present disclosure. A first node and a second node are illustrated in FIG. 3 and labeled 1 and 2, respectively. The first node and second node have experienced a link failure and FIG. 3 shows an example of link recovery. A receive beam sweep 302 is shown for the first node. A transmit burst 304 on a first of M directional beams is shown for the second node. A corresponding timeline 306 for the first and second node is also shown. In this aspect, beam correspondence for both first node and the second node is assumed. That is, when a suitable directional receive beam for either the first node or the second node is found, a suitable transmit beam will be in the opposite direction. Similarly, when a suitable transmit beam is found for either the first node or the second node, a suitable receive beam will be in the opposite direction.

To begin link recovery, the second node transmits a transmit burst 304 over transmit beam 1. At the same time, the first node performs a receive beam sweep 302 over N receive beams to see if a suitable receive beam may be found. After transmitting the transmit burst 304, the second node switches, after a short transmit receive switching time (shown in black) on timeline 306, to receive over a receive beam corresponding to transmit beam 1, as shown by the R in timeline 306. In this example, no suitable receive beam is found. The process is repeated with the second node transmitting a burst on another transmit beam.

This time, the second node transmits a second transmit burst 308 over transmit beam 2. At the same time node 1 performs a second receive beam sweep 306 operation to see if a suitable receive beam may be found. After transmitting the second transmit burst 308, the second node switches, after a short transmit receive switching time (shown in black) on timeline 310, to receive over a receive beam corresponding to transmit beam two as shown (R) in timeline 310. Again, in this example, no suitable receive beam is found. The process is repeated with the second node transmitting on another beam.

Eventually, a suitable receive beam may be found. In this example, the second node transmits an M*th transmit burst 312 over transmit beam M*. At the same time, the first node performs an Mth receive beam sweep 310 to see if a suitable receive beam may be found. This time, the first node determines that receive beam 3 is a suitable receive beam. After transmitting the transmit burst 312, the second node switches, after a short transmit receive switching time (shown in black), to receive over a beam corresponding to transmit beam M* as shown (R) in timeline 314. This time the first node sends an indication to second node that a suitable beam pair has been found. The second node receives the indication during (R) as shown in timeline 314.

Thus, a link may be reestablished with the first node receiving on beam 3 and second node transmitting on node M*. Because, there is beam correspondence, the first node may transmit on a beam corresponding to the suitable receive beam, beam 3 316; and the second node may receive on a beam corresponding transmit beam, M*318. No further beam search is needed.

Figure 4:
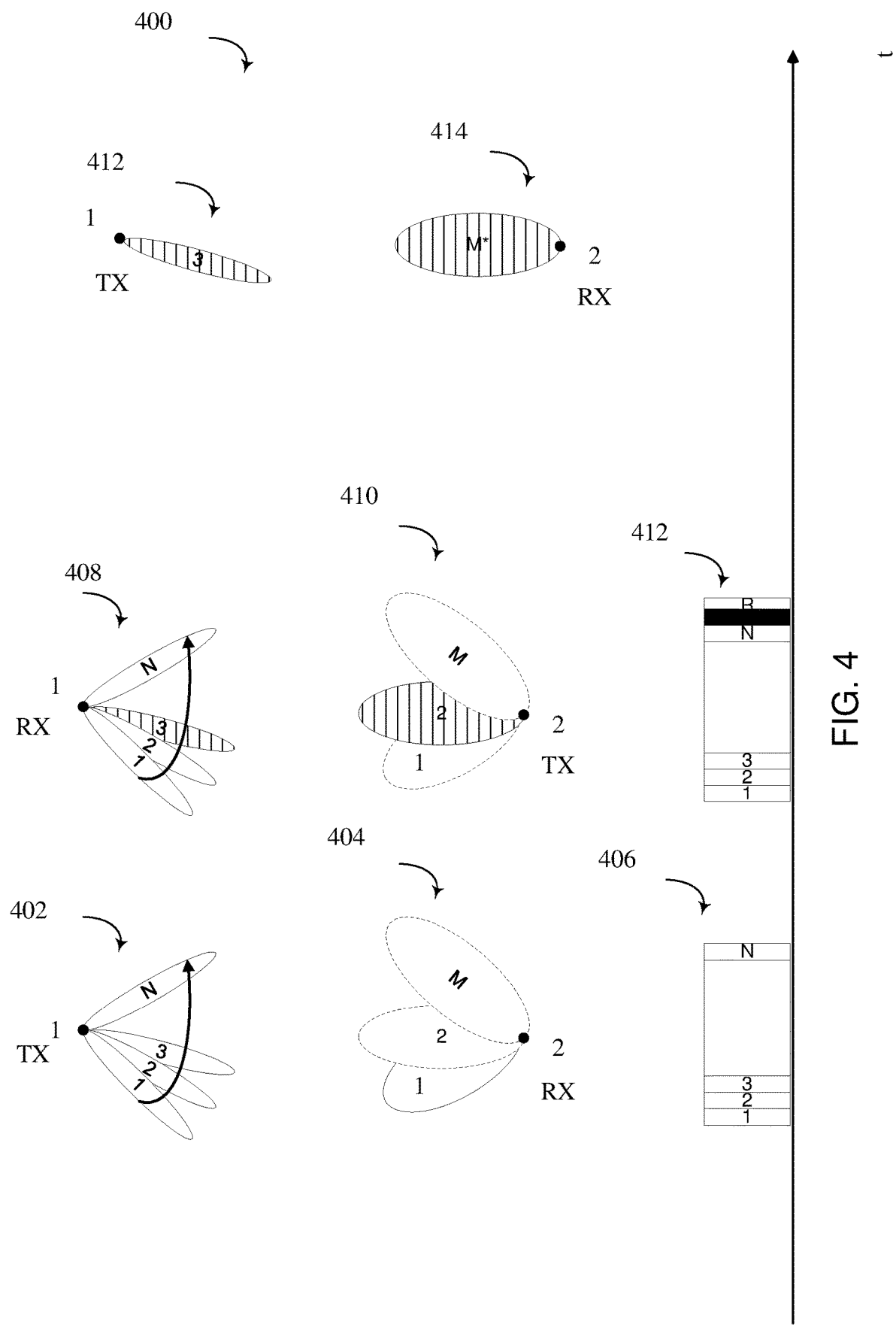
FIGS. 4 and 5 illustrates a second example of expedited link recovery in accordance with aspects of the present disclosure.

FIG. 4 illustrates an example of expedited link recovery 400 in accordance with aspects of the present disclosure. A first node and a second node are illustrated in FIG. 4 and labeled 1 and 2, respectively. The first node and the second node have experienced a link failure and FIG. 4 shows an example of link recovery. A transmit beam sweep 402 followed by a receive beam sweep 408 is shown for the first node. The second node is shown receiving on beam 1 of M possible beams 404 followed by a transmit burst on beam 2 of M possible beams 410. Corresponding timelines 406 and 412 are also respectively shown. In this aspect beam correspondence is assumed. That is, when a suitable directional receive beam is found, a suitable transmit beam will be in the opposite direction. Similarly, when a suitable transmit beam is found, a suitable receive beam will be in the opposite direction.

Figure 5:
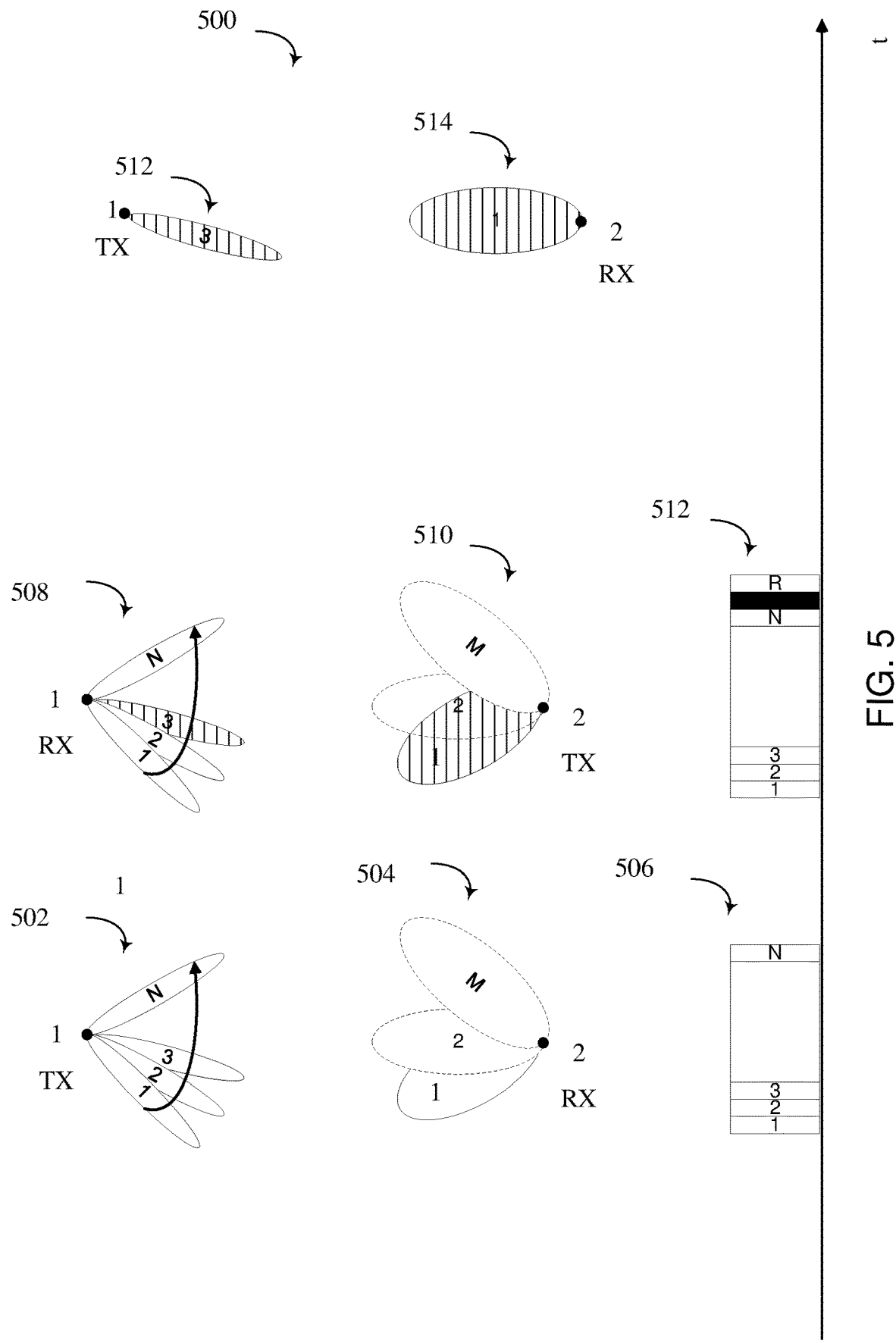

The first and second nodes alternate transmit and receive functions. FIG. 4 illustrates an example of how a suitable beam pair may be found when the second node is transmitting. FIG. 5 illustrates an example of how a suitable beam pair may be found when the first node is transmitting.

The first node transmits a transmit beam sweep 402. At the same time, during timeline 406, the second node receives on beam 1 of M possible beams 404 to determine if beam 1 is a suitable receive beam. In this example, the second node determines that beam 1 is not a suitable beam. The second node then transmits a burst on beam 2 410. At the same time node 1 performs a receive beam sweep 408 to determine if there is a suitable receive beam. In this example, node 1 determines that beam 3 is a suitable receive beam and transmits on a transmit beam corresponding to receive beam 3, an indication that a suitable beam pair has been found after a short transmit receive switching time as shown (in black) on timeline 412. The second node receives the indication during R shown in timeline 412.

Thus, a link may be reestablished with the first node receiving on beam 3 and the second node transmitting on beam 2. Because, there is beam correspondence, the first node may transmit on a beam corresponding to suitable receive beam 3 412, and the second node may receive on a beam corresponding to transmit beam M*414.

FIG. 5 illustrates an example of expedited link recovery 500 in accordance with aspects of the present disclosure. A first node and a second node are illustrated in FIG. 5 and labeled 1 and 2, respectively. The first and second node have experienced a link failure and FIG. 5 shows an example of link recovery. A transmit beam sweep 502 followed by a receive beam sweep 508 is shown for the first node. The second node is shown receiving on beam 1 of M possible beams 504 followed by a transmit burst on beam 1 510 of M possible beams. Corresponding timelines 506 and 512 are also shown. In this aspect, beam correspondence is assumed. That is, when a suitable directional receive beam is found, a suitable transmit beam will be in the opposite direction. Similarly, when a suitable transmit beam is found, a suitable receive beam will be in the opposite direction.

In this aspect, the first node and the second node alternate transmit and receive functions. FIG. 4 illustrated an example of how a suitable beam pair may be found when node 2 is transmitting. FIG. 5 illustrates an example of how a suitable beam pair may be found when node 1 is transmitting.

Node 1 transmits a transmit beam sweep 502. At the same time, during timeline 506, the second node receives on beam 1 of M possible beams 504 to determine if beam 1 is a suitable receive beam. In this example, second node determines that beam 1 is a suitable receive beam. The second node then transmits a burst on a transmit beam corresponding to receive beam 1 510 instead of advancing to the next beam. At the same time, the first node performs a receive beam sweep 508 to determine a suitable receive beam. In this example, beam 3 is a suitable receive beam.

Thus, a link may be reestablished with the first node receiving on beam 3 and second node transmitting on beam 1. Because, there is beam correspondence, the first node may transmit on a beam corresponding to the suitable receive beam 3 512, and the second node may receive on a beam corresponding transmit beam 1 514.

Figure 6A:
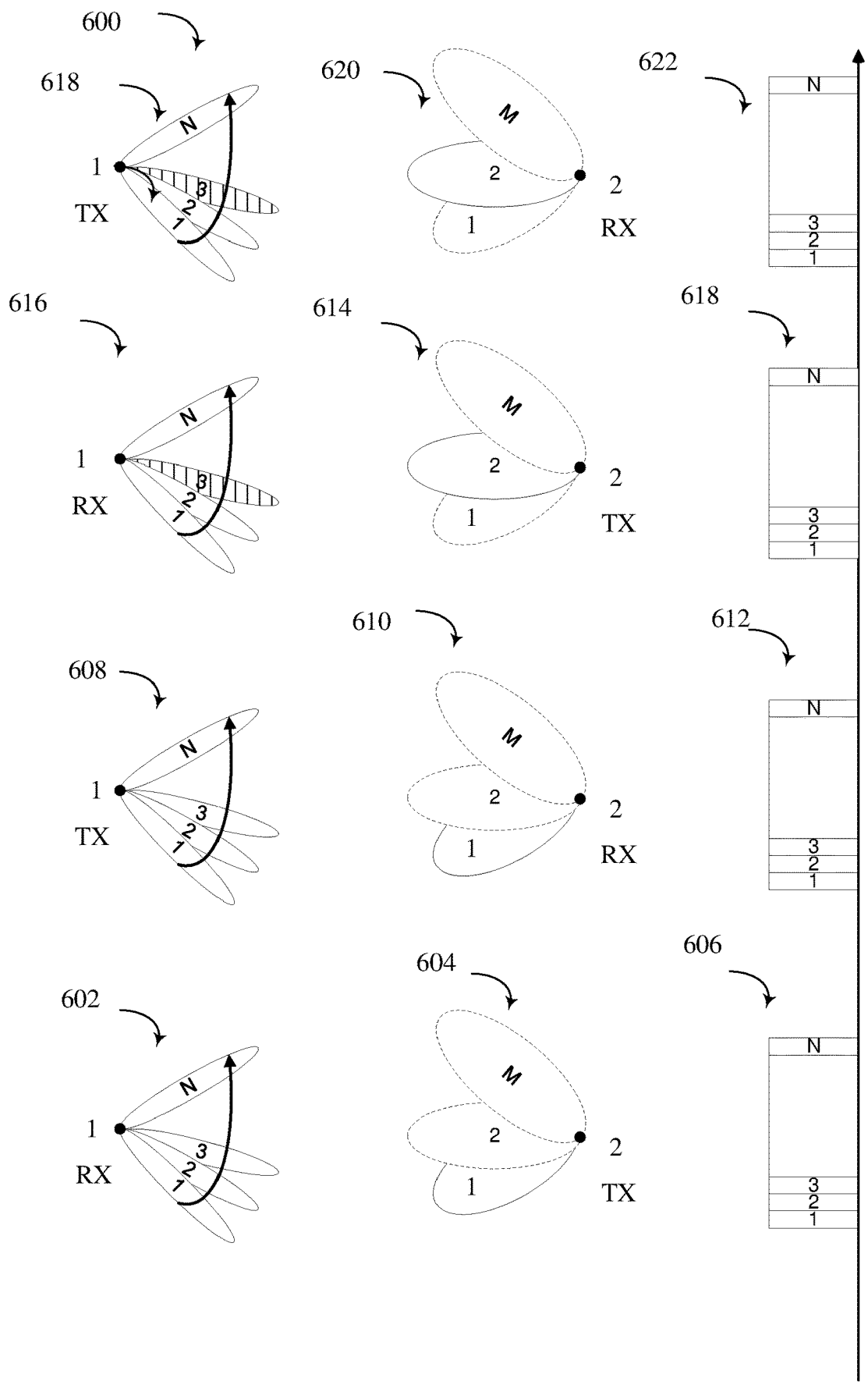

FIGS. 6a and b illustrate an example of expedited link recovery 600 in accordance with aspects of the present disclosure. A first node and a second node are illustrated in FIGS. 6a and b and labeled 1 and 2, respectively. The first and second node have experienced a link failure and FIGS. 6a and b show an example of link recovery. A receive beam sweep 602 followed by a transmit beam sweep 608 is shown for the first node. The second node is shown transmitting a transmit burst 604 on beam 1 of M possible beams 604 and then receiving on beam 1 of M possible beams 610. Corresponding timelines 606 and 612 are also shown. In this aspect beam correspondence is not assumed for first node. That is, when a suitable directional receive beam for the first node is found, a suitable transmit beam will not necessarily be in the opposite direction. In this aspect, the first node and the second node alternate transmit and receive functions.

The second node transmits a transmit burst 604 on beam 1. At the same time, during timeline 606, the first node performs a receive beam sweep 602 to determine if one of the N receive beams is a suitable receive beam. In this example, no suitable receive beam is found. The first node then performs a transmit beam sweep 608 and the second node receives on beam 1 of M possible beams 610 to determine if beam 1 is a suitable receive beam. In this example beam 1 is not a suitable receive beam.

The second node now transmits a second burst 614 on beam 2 of M possible transmit beams. At the same time, according to timeline 618, the first node performs a second receive beam sweep 616 to determine if one of the N receive beams is a suitable receive beam. In this example, the first node determines that beam 3 is a suitable receive beam. The first node then performs a second transmit beam sweep indicating in each beam that a receive beam has been found. At the same time, according to timeline 622, The second node receives on beam 2. The second node, receives indication that the first node has found a suitable receive beam. The second node may now inform the first node which transmit beam is a suitable transmit beam. The suitable transmit beam, might be for example, the beam on which the second node received the most robust signal during the first nodes transmit beam sweep.

FIG. 6b illustrates another example of how the transmit and receive beams may be found for both the first and second nodes. Again, the second node has beam correspondence and first node may or may not have beam correspondence. The second node transmits a transmit burst on beam 1. The first node performs a receive beam sweep 650 according to timeline 654. In this example, the first node determines that beam 3 is a suitable receive beam.

The first node then performs a transmit beam sweep 660 transmitting an indication that a suitable (good) receive beam has been found on each transmit beam according to timeline 664. The second node receiving on beam 1 662 receives the indication that node 1 has found a good receive beam. The second node thus knows beam 1 is a suitable beam for the second node. The second node may also determine from timeline 658 and the robustness of the signals received during the timeline 664, a suitable beam for the first node to transmit on. In this example, the first node determines beam 4 is an appropriate transmit beam. The first node now receiving on beam 3 656 may now receive a transmission from node 1 transmitting on transmit beam 1 658. The next transmission from the second node may contain information that informs the first node that the first node's suitable transmit beam is beam 4.

Thus, the first node may now establish a link with the second node. The first node will receive on receive beam 3 and transmit on transmit beam 4. Notably, these are not corresponding beams. The second node may now transmit on transmit beam 1 and receive on the beam corresponding to receive beam 1.

Figure 7:
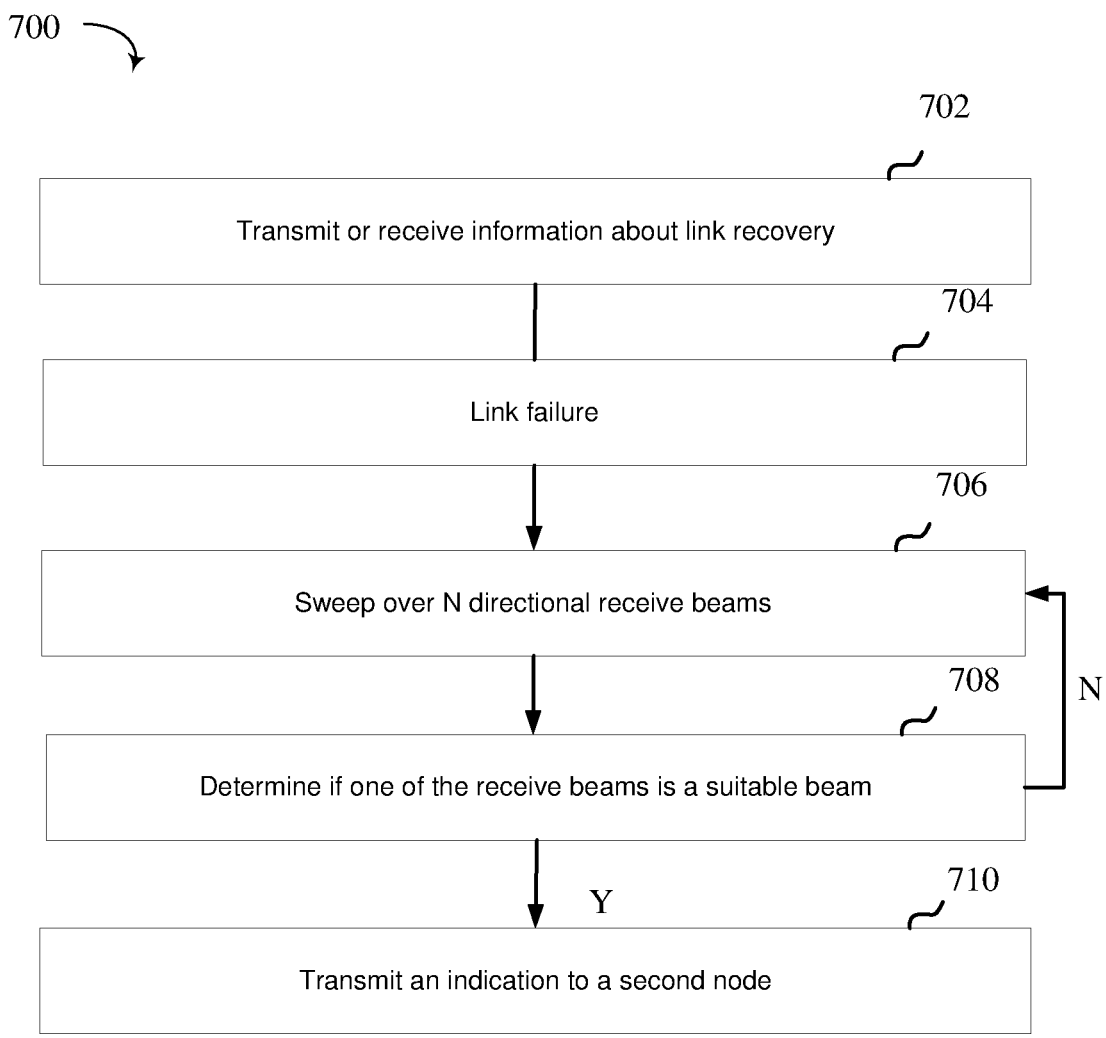
FIG. 7 is a flow diagram for a first node illustrating a first expedited link recovery flow in accordance with aspects of the present disclosure.

FIG. 7 illustrates a flow diagram for a first node illustrating an expedited link recovery flow 700 in accordance with aspects of the present disclosure. In this aspect, a first and second node have a link established. Link recovery procedures may have been predetermined or the first node may transmit or receive information about link recovery 702. At some point, the link between the first and the second node may become unsuitable for communication resulting in a link failure 704.

After link failure, the first node may sweep over N directional receive beams 706 listening for transmissions from the second node. The first node may determine if one of the receive beams is a suitable beam 708 by receiving, for example, a robust signal from the second node. If there is no suitable beam, the first node may sweep over the N directional receive beams 706 once again and repeating the beam sweep until a suitable beam is found. When a suitable receive beam is found, the first node may transmit an indication to the second node 710 that a suitable receive beam has been found.

Assuming beam correspondence in this aspect, the first node may use as a transmit beam a beam corresponding to the suitable receive beam. Thus, the first node may re-establish a link with the second node.

Figure 8:
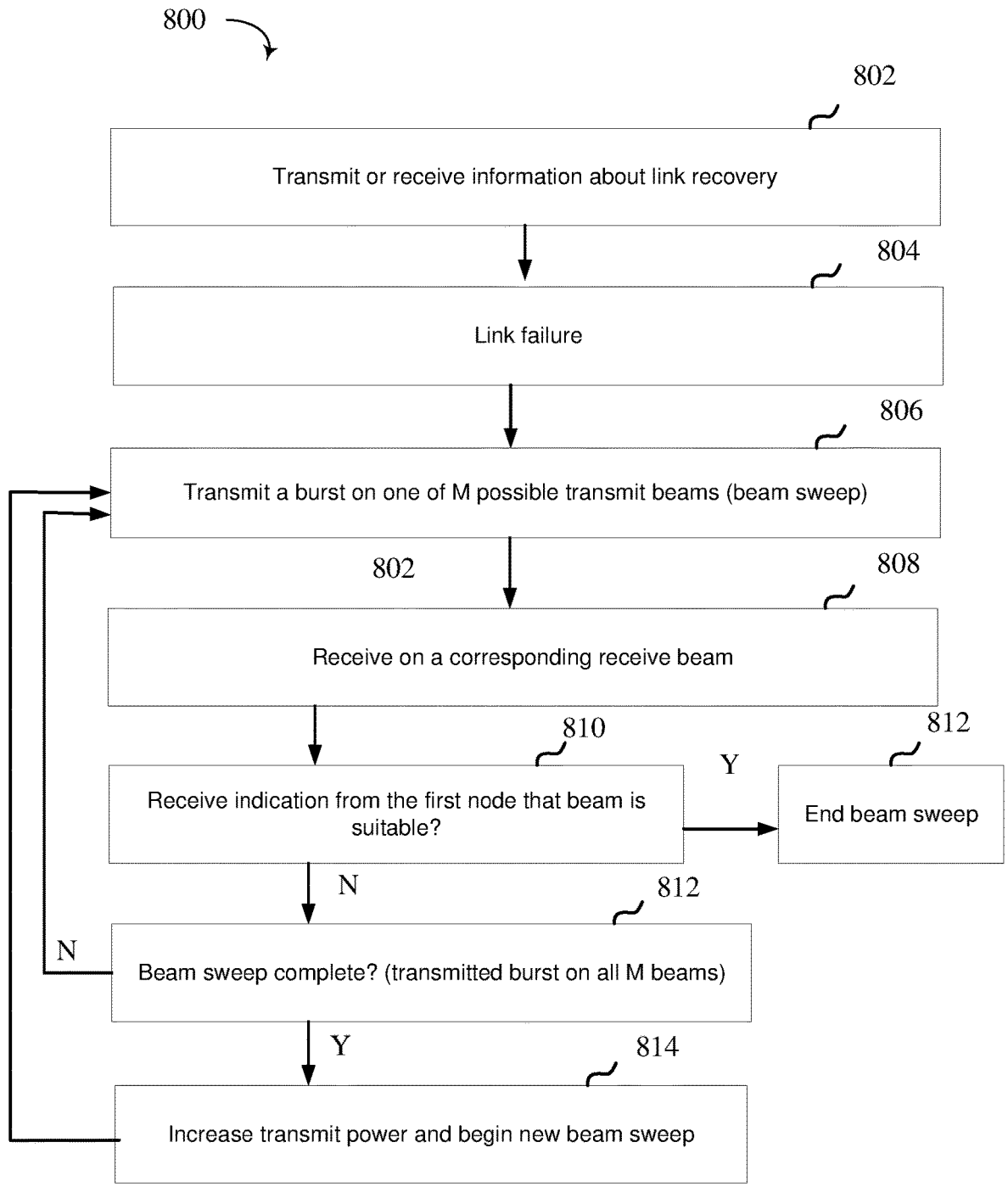
FIG. 8 is a flow diagram for a second node illustrating a first expedited link recovery flow in accordance with aspects of the present disclosure.

FIG. 8 illustrates a flow diagram for a second node illustrating an expedited link recovery flow 800 in accordance with aspects of the present disclosure. In various aspects, the flow diagram for FIG. 7 may be used for the first node while the flow diagram of FIG. 8 may be used for the second node. Link recovery procedures may have been predetermined or the second node may transmit or receive information about link recovery 802 to the first node. At some point, the link between the first and the second node may become unsuitable for communication resulting in link failure 804.

The second node may then transmit a burst on one of M possible transmit beams 806 as a first transmission burst in a beam sweep. Next, the second node may receive on a corresponding receive beam 808. The second node may then determine if it has received an indication that the beam is suitable 810. If the second node receives an indication that the beam is suitable it may end the beam sweep 812. In various aspects, the indication may be transmitted on a single resource. If no indication is received, the second node may then determine if the beam sweep is complete (i.e. the second node has transmitted a burst on all M possible beams) 812. If not, the second node may transmit a burst on another of the M possible beams 806. If the beam sweep is not complete, the second node may increase transmit power and begin a new beam sweep procedure 184 and continue the flow as shown.

Figure 9:
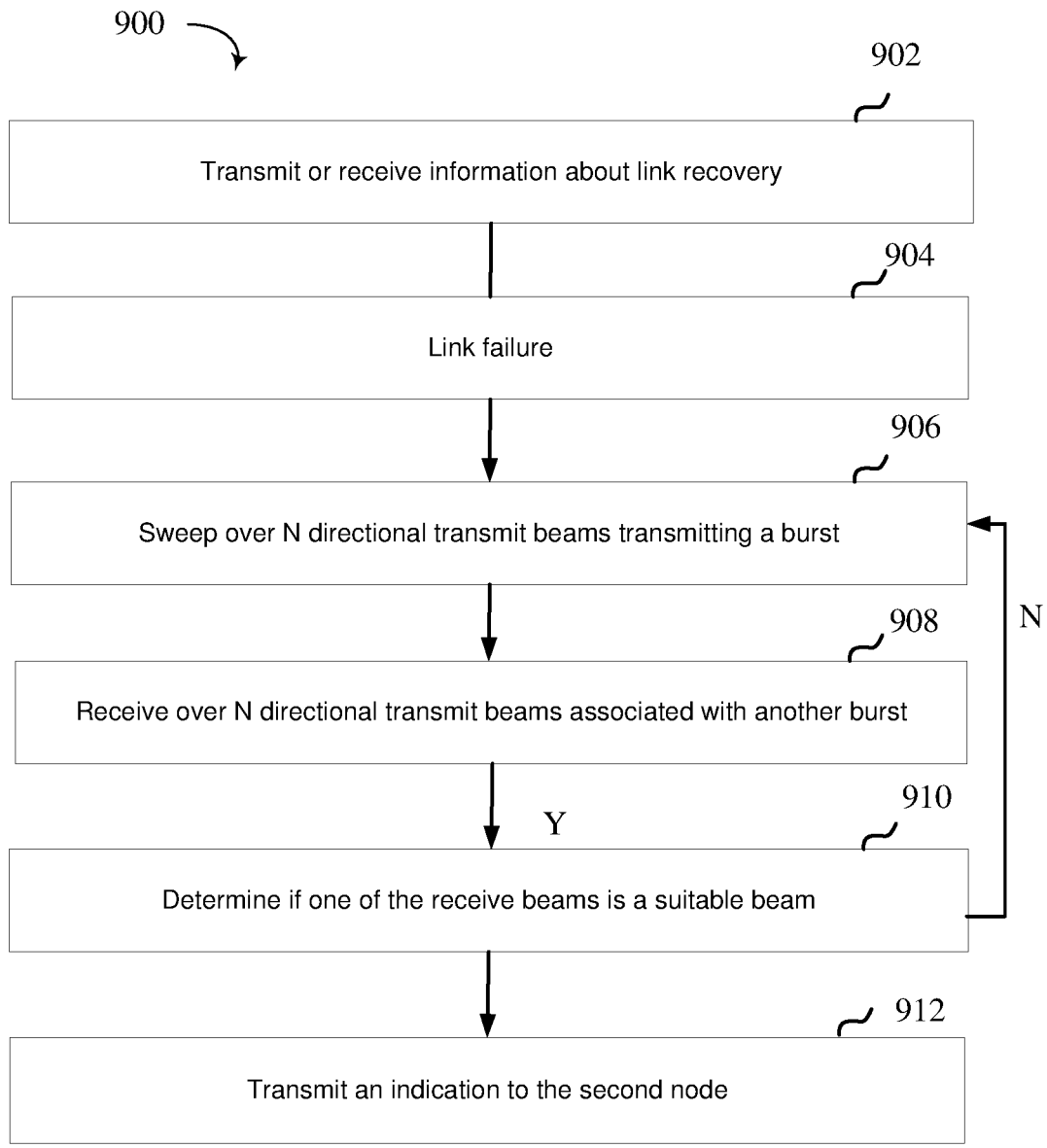
FIG. 9 is a flow diagram for a first node illustrating a second expedited link recovery flow in accordance with aspects of the present disclosure.

FIG. 9 illustrates a flow diagram for a first node illustrating an expedited link recovery flow 900 in accordance with aspects of the present disclosure. Link recovery procedures may have been predetermined or the first node may transmit or receive information about link recovery 902 to the first node. At some point, the link between the first and the second node may become unsuitable for communication resulting in link failure 904.

The first node may sweep over N directional transmit beams transmitting a burst 906. The burst may be comprised of a transmission on one or more resources in each of the N directional beams. The first node may then receive over N directional beams associated with another burst 908. This burst may be a transmission burst from the second node. The first node may then determine if one of the receive beams is a suitable beam. 910. If the receive beam is suitable, the first node may transmit an indication to the second node. 912. If the receive beam is not a suitable receive beam, the first node may then sweep over N directional beams transmitting a second burst 906 and continue with the flow as shown.

Figure 10:
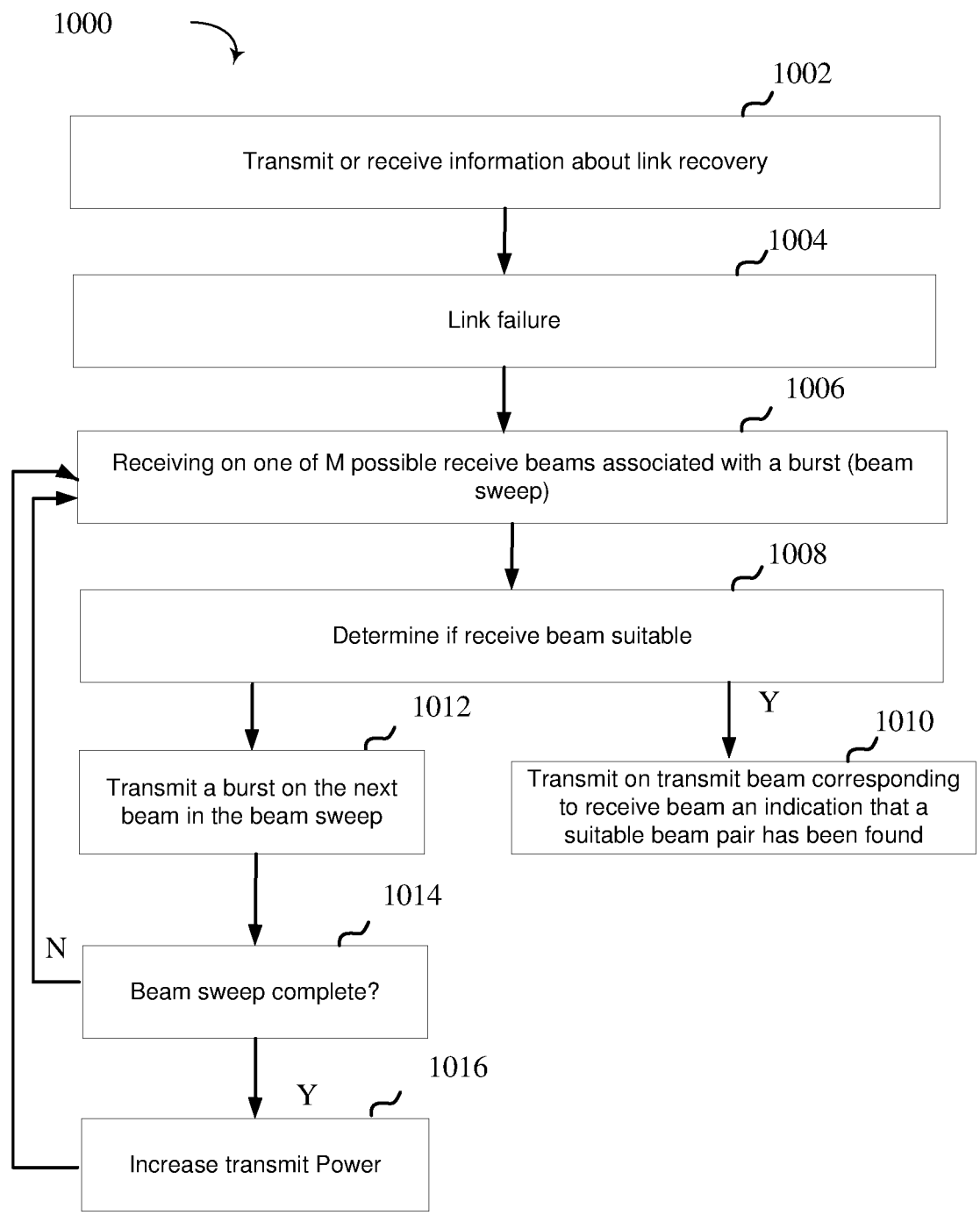
FIG. 10 is a flow diagram for a second node illustrating a second expedited link recovery flow in accordance with aspects of the present disclosure.

FIG. 10 illustrates a flow diagram for a second node illustrating an expedited link recovery flow 1000 in accordance with aspects of the present disclosure. In various aspects, the flow diagram for FIG. 9 may be used for the first node while the flow diagram of FIG. 10 may be used for the second node. Link recovery procedures may have been predetermined or the second node may transmit or receive information about link recovery 1000 to the first node. At some point, the link between the first and the second node may become unsuitable for communication resulting in link failure 1004.

The second node may receive on one of M possible receive beams associated with a burst 1006 as part of a beam sweep. The burst may be a burst from the first node. The second node may determine if the receive beam is a suitable beam 1008. A suitable beam may be for example a beam robust enough for a suitable link. If the beam is a suitable beam, the second node may transmit on a transmit beam corresponding to the receive beam an indication that a suitable beam pair has been found 1010. If a suitable beam is not found the second node may transmit a burst on the next beam in the beam sweep 1012. The second node may then determine whether the beam sweep is complete 1014. If not, the second node may advance to the next beam and receive on the next of M possible receive beams associated with a burst 1006. If the beam sweep is complete, the second node may increase transmit power 1016 for future transmissions and begin the beam sweep procedure once again as shown in FIG. 10.

Figure 11:
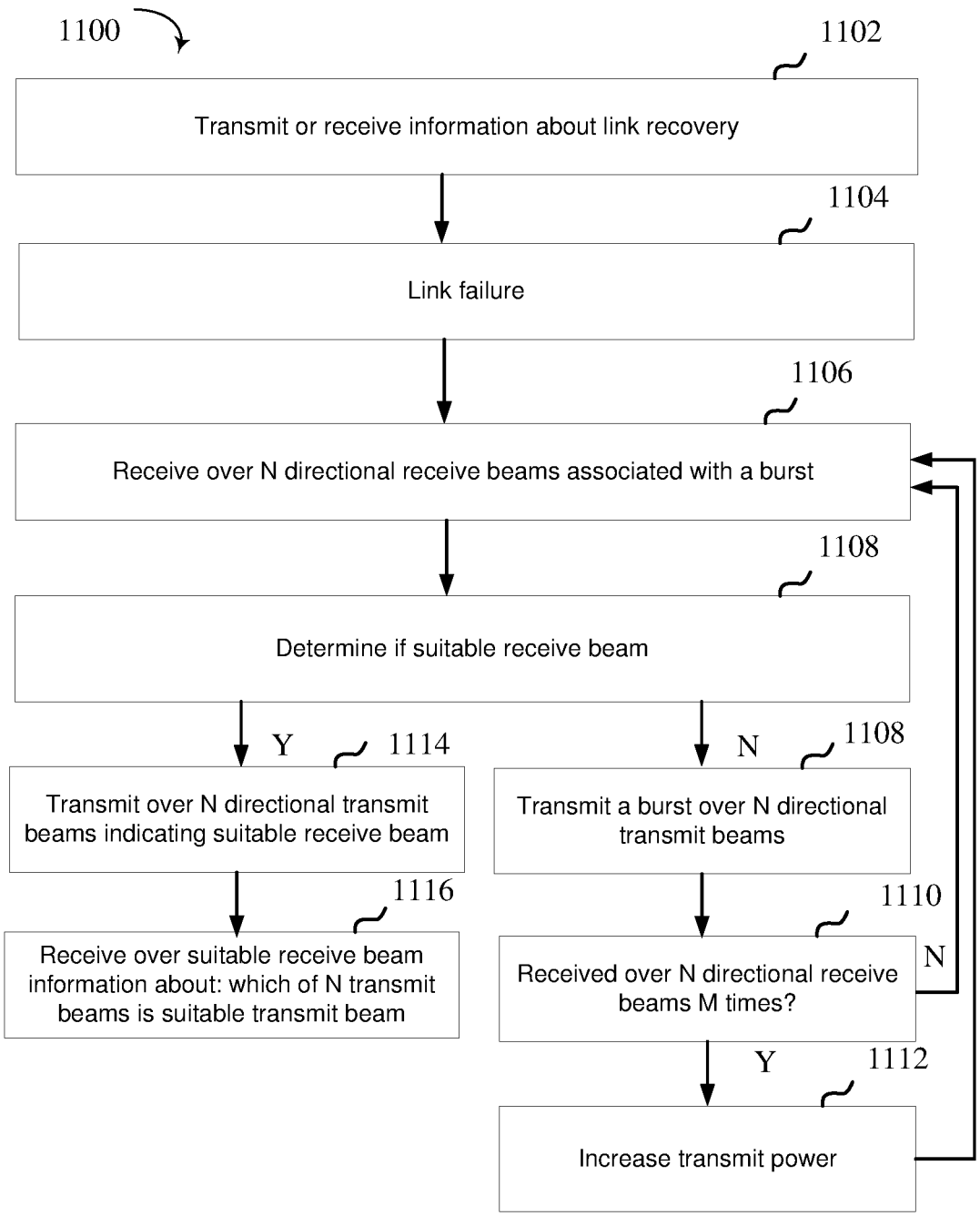
FIG. 11 is a flow diagram for a first node illustrating a third expedited link recovery flow in accordance with aspects of the present disclosure.

FIG. 11 illustrates a flow diagram for a first node illustrating an expedited link recovery 1100 in accordance with aspects of the present disclosure. Link recovery procedures may have been predetermined or the second node may transmit or receive information about link recovery 1102 to the first node. At some point, the link between the first and the second node may become unsuitable for communication resulting in link failure 1104. In this aspect, the first node may or may not have beam correspondence. That is, a suitable receive beam may or may not be a suitable transmit beam.

The first node may receive over N directional receive beams associated with a burst 1106. The burst may be a transmission burst from a second node. The first node may determine if one of the directional receive beams is a suitable receive beam 1108. The first node may identify a suitable receive beam by receiving a portion of the burst that is robust enough for a suitable communication link with the second node.

If the first node determines it does not have a suitable receive beam, the first node may transmit a burst over N directional transmit beams 1108. The first node may then determine if it has received over N directional receive beam M times 1110. If it has not, it will receive over N directional receive beams associated with a burst 1106 once again. If it has, the first node will increase transmit power 1112 for future transmissions with flow reverting to receive over N directional receive beams associated burst 1106. Flow will continue as shown in FIG. 11.

If the first node determines it does have a suitable beam, it will transmit a burst over N directional transmit beams indicating that it has a suitable receive beam 1114. This will allow the second node to receive the indication and identify a suitable transmit beam for first node and transmit information to first node identifying the suitable transmit beam. The first node may then receive this beam information about: which of the N transmit beams is a suitable transmit beam 1116.

Figure 12:
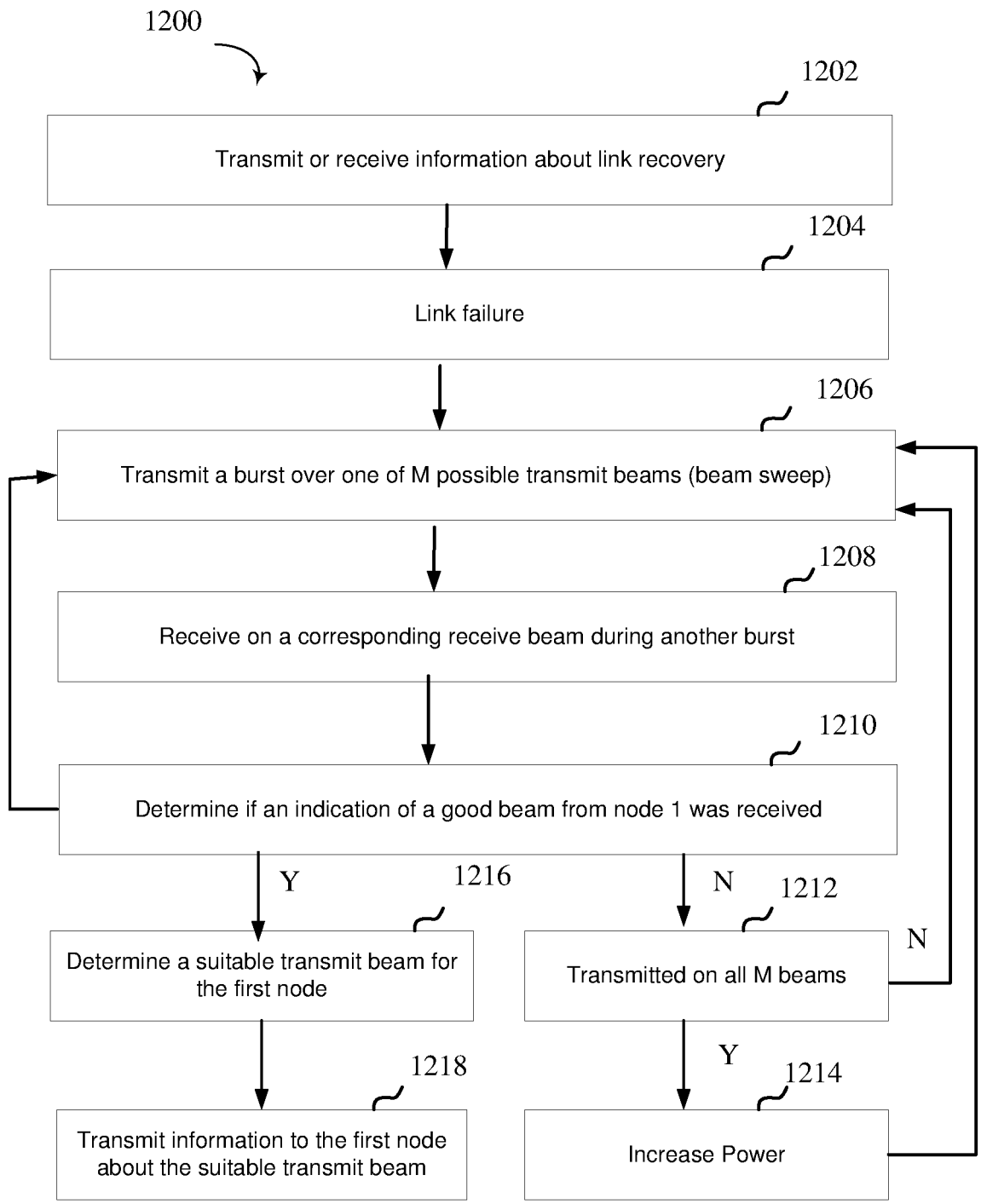
FIG. 12 is a flow diagram for a second node illustrating a third expedited link recovery flow in accordance with aspects of the present disclosure.

FIG. 12 is a flow diagram for a second node illustrating an expedited link recovery flow 1200 in accordance with aspects of the present disclosure. In various aspects, the flow diagram for FIG. 11 may be used for the first node while the flow diagram of FIG. 12 may be used for the second node. Link recovery procedures may have been predetermined or the second node may transmit or receive information about link recovery 1202 to the first node. At some point, the link between the first and the second node may become unsuitable for communication resulting in link failure 1204. In this aspect, the first node may or may not have beam correspondence. That is, a suitable receive beam for the first node may or may not be a suitable transmit beam. The second node in this aspect has beam correspondence.

The second node may transmit a burst over one of M possible beams 1206 as part of a beam sweep. The second node may then receive on a corresponding receive beam during another burst 1208. This other burst may be transmitted from the first node. The second node may then determine if an indication of a good beam from first node has been received 1210.

If an indication has not been received, the second node may determine if it has completed its beam sweep and transmitted on all M beam sweeps 1212. If it has not, the second node will continue its beam sweep and transmit a burst over one of M possible transmit beams 1206. If it has transmitted on all M beam sweeps, the second node will increase power 1214 and begin a new beam sweep and transmit a burst over one of M possible transmit beams 1206.

If an indication has been received, the second node will determine a suitable transmit beam for the first node 1216 and transmit information to the first node about the suitable transmit beam 1218.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A method of operating a second node, comprising:
   determining that there has been a failure in a communication link between a first node and the second node;
   sweeping over M possible transmit beams in a beam sweep operation by transmitting a burst on at least one of the M possible transmit beams;
   receiving a single feedback bit from the first node when the second node has transmitted on a suitable beam wherein the single feedback bit from the first node is received after a transmit-receive switching time after a transmit burst;
   terminating the beam sweep operation over M possible transmit beams immediately when the single feedback bit from the first node is received; and
   reestablishing the communication link between the first node and the second node using the suitable beam.

2. The method of claim 1 wherein the second node is a next generation Node B (gNB).

3. The method of claim 1 wherein the second node is a User Equipment (UE).

4. The method of claim 1 further comprising increasing transmit power and sweeping over at least one of the M possible directional transmit beams a second time when the single feedback bit from the first node is not received.

5. The method of claim 1 further comprising transmitting information to the first node about a beam recovery procedure or receiving information from the first node about the beam recovery procedure.

6. A second node, comprising:
   a transmitter configured to:
   sweep over M possible transmit beams in a beam sweep operation by transmitting a burst on at least one of the M possible transmit beams; and
   reestablish a communication link between a first node and the second node using a suitable beam;
   a receiver configured to:
   determine that there has been a failure in a communication link between the first node and the second node; and
   receive a single feedback bit from the first node when the second node has transmitted on the suitable beam wherein the single feedback bit from the first node is received after a transmit-receive switching time after a transmit burst wherein the transmitter is further configured to terminate the beam sweep operation over M possible transmit beams immediately when the single feedback bit from the first node is received.

7. The second node of claim 6 wherein the second node is a next generation Node B (gNB).

8. The second node of claim 6 wherein the second node is a User Equipment (UE).

9. The second node of claim 6 wherein the transmitter is configured to increase transmit power and sweep over at least one of the M possible directional transmit beams a second time when the single feedback bit from the first node is not received.

10. The second node of claim 6 wherein the transmitter is further configured to transmit information to the first node about a beam recovery procedure or the receiver is further configured to receive information from the first node about the beam recovery procedure.

11. A second node, comprising:
    means for determining that there has been a failure in a communication link between a first node and the second node;
    means for sweeping over M possible transmit beams in a beam sweep operation by transmitting a burst on at least one of the M possible transmit beams;
    means for receiving a single feedback bit from the first node when the second node has transmitted on a suitable beam wherein a single feedback bit from the first node is received after a transmit-receive switching time after a transmit burst;
    means for terminating the beam sweep operation over M possible transmit beams immediately when the single feedback bit from the first node is received; and
    means for reestablishing the communication link between the first node and the second node using the suitable beam.

12. The second node of claim 11 wherein the second node is a next generation Node B (gNB).

13. The second node of claim 11 wherein the second node is a User Equipment (UE).

14. The second node of claim 11 further comprising increasing transmit power and sweeping over at least one of the M possible directional transmit beams a second time when the single feedback bit from the first node is not received.

15. The second node of claim 11 further comprising transmitting information to the first node about a beam recovery procedure or receiving information from the first node about the beam recovery procedure.

16. A non-transitory computer-readable medium storing computer executable code, comprising code to:
    determine that there has been a failure in a communication link between a first node and the second node;
    sweep over M possible transmit beams in a beam sweep operation by transmitting a burst on at least one of the M possible transmit beams;
    receive a single feedback bit from the first node when the second node has transmitted on a suitable beam wherein the single feedback bit from the first node is received after a transmit-receive switching time after a transmit burst;
    terminate the beam sweep operation over M possible transmit beams when the indication single feedback bit from the first node is received and before the beam sweep operation is complete; and
    reestablish the communication link between the first node and the second node using the suitable beam.

17. The second node of claim 16 wherein the second node is a next generation Node B (gNB).

18. The second node of claim 16 wherein the second node is a User Equipment (UE).

19. The second node of claim 16 further comprising code to increase transmit power and sweep over at least one of the M possible directional transmit beams a second time when the single feedback bit from the first node is not received.

20. The second node of claim 16 further comprising code to transmit information to the first node about a beam recovery procedure or receiving information from the first node about the beam recovery procedure.

* * * * *